United States Patent
Preisler et al.

(10) Patent No.: US 11,173,851 B2
(45) Date of Patent: Nov. 16, 2021

(54) VEHICLE DECORATIVE TRIM PART HAVING AN INJECTION MOLDED, FRONTSIDE PROTECTIVE COVERING

(71) Applicant: Global IP Holdings, LLC, Sterling Heights, MI (US)

(72) Inventors: Darius J. Preisler, Macomb, MI (US); Christopher A. Heikkila, Washington Township, MI (US); Scott A. Grajek, Washington Township, MI (US); Jason T. Murar, Macomb, MI (US)

(73) Assignee: Global IP Holdings, LLC, Sterling Heights, MI (US)

( * ) Notice: Subject to any disclaimer, the term of this patent is extended or adjusted under 35 U.S.C. 154(b) by 203 days.

(21) Appl. No.: 16/518,145

(22) Filed: Jul. 22, 2019

(65) Prior Publication Data

US 2019/0337469 A1 Nov. 7, 2019

Related U.S. Application Data

(63) Continuation-in-part of application No. 16/002,130, filed on Jun. 7, 2018, now Pat. No. 10,906,476, which is a continuation of application No. 14/264,598, filed on Apr. 29, 2014, now abandoned.

(51) Int. Cl.
*B60R 13/02* (2006.01)
*B60Q 3/20* (2017.01)
*B60R 13/00* (2006.01)

(52) U.S. Cl.
CPC ............... *B60R 13/02* (2013.01); *B60Q 3/20* (2017.02); *B60R 13/005* (2013.01); *B60R 2013/0287* (2013.01)

(58) Field of Classification Search
CPC .............. B60R 13/02; B60R 13/006; B60R 2013/0287; B60Q 3/20
See application file for complete search history.

(56) References Cited

U.S. PATENT DOCUMENTS

| 5,423,933 | A | 6/1995 | Horian |
| 5,744,210 | A | 4/1998 | Hofmann et al. |
| 5,750,160 | A | 5/1998 | Weber et al. |
| 6,468,458 | B1* | 10/2002 | Anderson ............. B29C 45/062 264/246 |
| 6,595,575 | B2 | 7/2003 | Morris |
| 6,752,443 | B1 | 6/2004 | Thompson et al. |

(Continued)

*Primary Examiner* — D Glenn Dayoan
*Assistant Examiner* — Melissa Ann Bonifazi
(74) *Attorney, Agent, or Firm* — Brooks Kushman P.C.

(57) ABSTRACT

A vehicle trim part having an injection molded, frontside protective covering is provided. The part includes a decorative layer having an outer surface which provides the appearance of a desirable material. An injection molded, light-transmissive protective layer is inter-bonded to the decorative layer and is integrally formed from a polymeric material which overlies and protects the decorative layer and provides a desired outer surface finish with little or no need for post-molding machining or polishing. The desired outer surface finish and the outer surface of the decorative layer at the interface between the layers form a reflected light pattern which is visible at the front of the part when lighting illuminates the outer surface finish and the outer surface of the decorative layer from the front of the part. The part may be a vehicle interior trim part.

29 Claims, 6 Drawing Sheets

(56) References Cited

U.S. PATENT DOCUMENTS

| | | |
|---|---|---|
| 6,800,325 B2 | 10/2004 | Ehrath et al. |
| 6,843,525 B2 | 1/2005 | Preisler |
| 6,905,155 B1 | 6/2005 | Presley et al. |
| 6,926,348 B2 | 8/2005 | Krueger et al. |
| 6,945,594 B1 | 9/2005 | Bejin et al. |
| 7,059,646 B1 | 6/2006 | DeLong et al. |
| 7,090,274 B1 | 8/2006 | Khan et al. |
| 7,121,601 B2 | 10/2006 | Mulvihill et al. |
| 7,188,881 B1 | 3/2007 | Sturt et al. |
| 7,207,616 B2 | 4/2007 | Sturt |
| 7,222,915 B2 | 5/2007 | Philippot et al. |
| 7,628,440 B2 | 12/2009 | Bernhardsson et al. |
| 7,909,379 B2 | 3/2011 | Winget et al. |
| 8,298,675 B2 | 10/2012 | Alessandro et al. |
| 8,475,884 B2 | 7/2013 | Kia |
| 2004/0078929 A1 | 4/2004 | Schoemann |
| 2006/0008609 A1 | 1/2006 | Snyder et al. |
| 2006/0255611 A1 | 11/2006 | Smith et al. |
| 2007/0065264 A1 | 3/2007 | Sturt et al. |
| 2007/0256379 A1 | 11/2007 | Edwards |
| 2008/0185866 A1 | 8/2008 | Tarrant et al. |
| 2009/0108639 A1 | 4/2009 | Sturt et al. |
| 2010/0206467 A1 | 8/2010 | Durand et al. |
| 2011/0260359 A1 | 10/2011 | Durand et al. |
| 2012/0247654 A1 | 10/2012 | Piccin et al. |
| 2013/0031752 A1 | 2/2013 | Davies |
| 2013/0075955 A1 | 3/2013 | Piccin et al. |
| 2013/0137798 A1 | 5/2013 | Piccin |
| 2013/0278002 A1 | 10/2013 | Preisler et al. |
| 2013/0278003 A1 | 10/2013 | Preisler et al. |
| 2013/0278007 A1 | 10/2013 | Preisler et al. |
| 2013/0278008 A1 | 10/2013 | Preisler et al. |
| 2013/0278009 A1 | 10/2013 | Preisler et al. |
| 2013/0278015 A1 | 10/2013 | Preisler et al. |
| 2013/0278018 A1 | 10/2013 | Preisler et al. |
| 2013/0278019 A1 | 10/2013 | Preisler et al. |
| 2013/0278020 A1 | 10/2013 | Preisler et al. |
| 2013/0280459 A1 | 10/2013 | Nakashima et al. |
| 2013/0280472 A1 | 10/2013 | Preisler et al. |
| 2013/0280473 A1 | 10/2013 | Preisler et al. |
| 2018/0281701 A1 | 10/2018 | Preisler et al. |

\* cited by examiner

VEHICLE DECORATIVE TRIM PART HAVING AN INJECTION MOLDED, FRONTSIDE PROTECTIVE COVERING

CROSS-REFERENCE TO RELATED APPLICATIONS

This application is a continuation-in-part of U.S. patent application Ser. No. 16/002,130, filed Jun. 7, 2018 which, in turn, is a continuation of application Ser. No. 14/264,598 filed on Apr. 29, 2014.

TECHNICAL FIELD

This invention relates, in general, to the field of vehicle decorative trim parts and, in particular, to such parts which have an injection molded, frontside protective covering and which forms a light pattern at the front of the parts.

OVERVIEW

The term "facing material" refers to a material used to conceal and/or protect structural and/or functional elements from an observer. Common examples of facing materials include upholstery, carpeting, and wall coverings (including stationary and/or moveable wall coverings and cubicle wall coverings). Facing materials typically provide a degree of aesthetic appearance and/or feel, but they may also provide a degree of physical protection to the elements that they conceal. In some applications, it is desirable that the facing material provide properties such as, for example, aesthetic appeal (for example, visual appearance and/or feel) and abrasion resistance.

Facing materials are widely used in motor vehicle construction. In the automotive industry, it is common practice to refer to various surfaces as being A-, B-, or C-surfaces.

As used herein, the term "A-surface" refers to an outwardly-facing surface for display in the interior of a motor vehicle. This surface is a very high visibility surface of the vehicle that is most important to the observer or that is most obvious to the direct line of vision. With respect to motor vehicle interiors examples include dashboards, instrument panels, steering wheels, head rests, upper seat portions, headliners, load floors and pillar coverings.

Sandwich-type panels having cellular cores have very important characteristics because of their light weight and high strength. Conventionally, such panels are constructed by sandwiching a cellular core having low strength characteristics between two skins, each of which is much thinner than the cellular core but has excellent mechanical characteristics.

Composite materials are typically made from two or more constituent materials with significantly different physical or chemical properties. Typically, the constituent materials include a matrix (or bond) material, such as resin (e.g. thermoset epoxy), and a reinforcement material, such as a plurality of fibers (e.g. woven layer of carbon fibers). When combined, the constituent materials typically produce a composite material with characteristics different from the individual constituent materials even through the constituent materials generally remain separate and distinct within the finished structure of the composite material. Carbon-fiber reinforced polymer (CFRP) is an example of such a composite material.

Different kinds of CFRP material arise by the fact that it is possible to use different types of resin, different types of fiber, and the fibers can be wound in different ways. However, the general principle of all CFRP materials is the same, i.e. the reinforcement of a resin matrix with strong carbon fibers. Other kinds of reinforcement include a fibrous, woven or particulate dispersion.

Despite the high strength and low density of CFRP, the material lacks dimensional stability caused by moisture absorption and desorption into and out of the resin material, depending on the local environmental conditions. This causes the CFRP to swell up in a humid environment by picking up moisture, and to shrink in a dry environment releasing the moisture. This causes dimensional changes that occur randomly.

One method of producing CFRP parts or panels is by layering sheets of carbon fiber cloth or fabric into a mold in the shape of the final product. The alignment and weave of the cloth fibers is chosen to optimize the strength and stiffness properties of the resulting material. The mold is then filled with epoxy and is heated or air-cured. The resulting part is very corrosion-resistant, stiff, and strong for its weight. Parts used in less critical areas are manufactured by draping cloth over a mold, with epoxy either preimpregnated into the fibers (also known as pre-preg) or "painted" over it. High-performance parts using single molds are often vacuum-bagged and/or autoclave-cured, because even small air bubbles in the material will reduce strength. An alternative to the autoclave method is to use internal pressure via inflatable air bladders or EPS foam inside the non-cured laid-up carbon fiber.

Composite materials may be preferred for many reasons. For example, composite materials may be stronger and/or lighter than traditional materials. As a result, composite materials are generally used to construct various objects such as vehicles (e.g., airplanes, automobiles, boats, bicycles, and/or components thereof), and non-vehicle structures (e.g., buildings, bridges, swimming pool panels, shower stalls, bathtubs, storage tanks, and/or components thereof).

Some plastic automotive parts are covered with wood trim after they are molded. Sometimes such plastic parts are composite plastic parts wherein an outer layer of the part is in-molded with a structural substrate of the part.

One practice in the automotive industry is utilization of all-plastic, fabricated parts, such as, but not limited to, instrument panels, interior trims, and door panels. It is known in other automotive parts areas that different, aesthetically pleasing outer surfaces enhance the overall appearance of the interior of automotive vehicles. Use of decorative appliques having wood grain finishes is often sought after.

Wood grain finishes are typically in the form of either simulated wood grain or genuine wood grain. The simulated wood grain finish may be achieved in one of several known manners: 1) backing a pre-printed film by a thin layer of a thermoplastic, such as polycarbonate; ABS (acrylonitrile/butadiene/styrene), or aluminum, followed by vacuum-forming to obtain the desired shape of the trim; 2) applying a lithograph on an aluminum sheet; and 3) dipping a substrate into a container of ink defining the wood grain appearance. Simulated wood grain finishes, however, are generally not as attractive as genuine wood grain finishes.

Genuine wood grain finishes may also be obtained in one of several known manners: 1) staining, sealing and protecting preformed laminates of wood having varying thicknesses which are then attached to a substrate via stapling, gluing, or any other similar attachment manner; 2) laminating an aluminum sheet with the genuine wood which is then welded or screwed onto a plastic part; and 3) adhesively bonding a thin laminate of wood to a pre-processed plastic substrate which is then stained and covered with a protective top-coat. Although the appearance of genuine wood is more attractive than simulated wood, the use of genuine wood is more expensive than that of simulated wood.

U.S. Pat. No. 5,423,933 discloses a method of producing a plastic-wood composite having the appearance of coated genuine wood. U.S. Pat. No. 5,744,210 discloses a natural wood-covered plastic part for an automotive vehicle and a method of making the part. U.S. Pat. No. 5,750,160 discloses a method of making plastic products such as door panels using nickel shell door molds having an authentic, textured mold surface reproduction of original wood.

The following U.S. patent documents relate to cargo management systems and trim panels for automotive vehicles: U.S. Pat. Nos. 6,752,443; 6,800,325; 6,843,525; 6,905,155; 6,926,348; 6,945,594; 7,059,646; 7,090,274; 7,121,601; 7,188,881; 7,207,616; 7,222,915; 7,628,440; 7,909,379; 8,298,675; 8,475,884; 2004/0078929; 2006/0008609; 2006/0255611; 2007/0065264; 2007/0256379; 2008/0185866; 2009/0108639; 2010/0206467; 2011/0260359; 2012/0247654; 2013/0031752; 2013/0075955; and 2013/0137798.

The following recent U.S. published applications are also related to the present application: 2013/0278002; 2013/0278003; 2013/0278007; 2013/0278008; 2013/0278009; 2013/0278015; 2013/0278018; 2013/0278019; 2013/0278020; 2013/0280459; 2013/0280472; and 2013/0280473.

Compression molding is a method of molding in which the molding material, generally preheated, is first placed in an open, heated mold cavity. The mold is closed with a top force or plug member, pressure is applied to force the material into contact with all mold areas, while heat and pressure maintained until the molding material has cured. The process may employ thermosetting resins in a partially cured stage, either in the form of granules, putty-like masses, or preforms. Compression molding is a high-volume, high-pressure method suitable for molding complex, high-strength fiberglass reinforcements. Advanced composite thermoplastics can be compression molded with unidirectional tapes, woven fabrics, randomly oriented fiber mat or chopped strand. The advantage of compression molding is its ability to mold large, fairly intricate parts. Also, it is one of the lowest cost molding methods compared with other methods such as transfer molding and injection molding; moreover, it wastes relatively little material, giving it an advantage when working with expensive compounds.

A problem associated with composites is that their function and design freedom is limited by the material which make up the composites. For example, one or more additional components are typically required to add one or more patterns, such as style features at the outer surface of the component.

In order to protect decorative layers which provides the appearance of desirable materials such as wood or carbon fiber, an overlying protective layer is often provided. Such protective layers are typically applied by spraying or flow coating. A problem with these application methods is the need to machine and/or polish the resulting protective layer to obtain the desired surface finish. Machining and polishing may incur increased labor and manufacturing costs, increased set-up and operating time and increased final part cost.

U.S. published application 2018/0281701 discloses a vehicle trim part having a layered, decorative finish. The part includes a polymeric substrate, a decorative layer overlying the polymeric substrate and a light-transmissive, protective layer overlying and protecting the decorative layer. The protective layer includes a front surface and a rear surface having a surface portion with a translucent surface finish. The decorative layer has an opening extending from a rear surface of the decorative layer to a front surface of the decorative layer and aligned with the translucent surface finish. Both a cross section of the opening at the front surface of the decorative layer and the translucent surface finish are sized and shaped to form a light pattern which is visible at the front of the part when artificial lighting illuminates the translucent surface finish from the rear of the part.

U.S. Pat. No. 6,595,575 discloses protective and decorative vehicle body panels for attachment to existent vehicle body structures. The panels include a rigid, resilient substrate layer, such as ABS, to provide increased resistant of a vehicle provided with the panels to damage from impacts with other objects. The panels also include a decorative layer visible through an overlying protective layer. The decorative layer provides the appearance of desirable materials, such as wood or carbon fiber and, in certain versions, includes wood and/or carbon fiber materials. The protective layer provides increased resistance of the panels to damage from impinging ultraviolet radiation. The panels can optionally be formed in complex three-dimensional concave and convex curves to provide additional aesthetic appeal and to better conform to complex vehicle contours.

Conventional plastic finishing operations include the following:

Vapor Polishing

Vapor polishing is a method using a solvent vapor, which flows over the surface of the acrylic and other engineering plastics such as polycarbonate, producing a more translucent finish. The end result depends on how good the original machine finish was prior to polishing, and it is essential the part is completely clean before starting with this procedure.

There are many benefits to using this method of polishing, including:

Smoothing out surface irregularities—especially important on medical parts as this ensures no debris sticks to the surface during sensitive procedures Gives a shiny, polished look and a "water-clear" finish Enables light to pass through freely Flame Polishing As its name suggests, the flame polishing method utilizes a fine, high-temperature, hydrogen-based flame, which is "flowed" over the surface of the plastic, actually melting it slightly. This method can be used on any shape or size of cut plastic, but is most effective on flat, external surfaces. This is a high-speed technique requiring a great deal of skill, but, if done properly, can achieve some of the clearest finishes.

Buffing

The buffing technique is used mainly on the exterior surfaces of larger components and gives a good finish. A spinning wheel with a cutting compound is used in the buffing process, which leaves microscopic scratches on the surface of the plastic, giving a slight haze or uneven finish.

Direct Machine Polishing

A specialty tooling is used to produce a polished finish with direct machine polishing. This is the most technical of all the methods, but it is capable of producing complicated surface profiles with virtually flawless finishes.

Despite the teachings of the above U.S. patent documents, there is still a need for an easily and inexpensively manufactured, light weight, vehicle trim part having a decorative layered finish and configured to form a light pattern at the front of the part which represents a logo or image.

SUMMARY OF EXAMPLE EMBODIMENTS

An object of at least one embodiment of the present invention is to provide a light weight, vehicle trim part having a light-transmissive protective layer which is injection molded onto a decorative layer wherein a desired outer surface finish is obtained with little or no need for post-molding machining or polishing and wherein a reflective light pattern is formed at the front of the part.

In carrying out the above object and other objects of the present invention, a vehicle decorative trim part having an injection molded, front side protective covering is provided. The component includes a decorative layer having an outer surface which provides the appearance of a desirable material and an injection molded, light-transmissive, protective layer inter-bonded to the decorative layer and integrally formed from a polymeric material overlying and protecting the decorative layer and providing a desired outer surface finish with little or no need for post-molding machining or polishing. The desired outer surface finish and the outer surface of the decorative layer at the interface between the layers form a reflective light pattern which is visible at the front of the part when lighting illuminates the outer surface finish and the outer surface of the decorative layer from the front of the part.

The protective layer may include 3-D structures bonded to the outer surface of the decorative layer by the injection molding wherein the 3-D structures are sized, shaped and arranged to irregularly reflect incident light to at least partially form the light pattern.

The light pattern may provide information.

The 3-D structures may provide a textured surface finish.

The 3-D structures may provide style features.

The light pattern may comprise a logo, a mark, a symbol, a graphic image or a monogram.

The polymeric material may be either a thermoset material or a thermoplastic material.

The polymeric material may protect the decorative layer from UV light and weathering.

The desirable material may be wood and the surface finish may be a wood grain finish.

The desirable material may be carbon-fiber reinforced plastic (CFRP) and the surface finish may be a carbon fiber finish.

The protective layer may have a thickness between about 0.1 mm and about 1.0 mm.

The surface finish may be a matte finish.

The decorative layer may comprise a composite material.

The composite material may be a carbon fiber-covered composite material.

The surface finish may be a finish clear of texture.

The surface finish may be a glossy or semi-glossy finish.

The decorative trim part may be a vehicle interior decorative trim part.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

Figure 1:
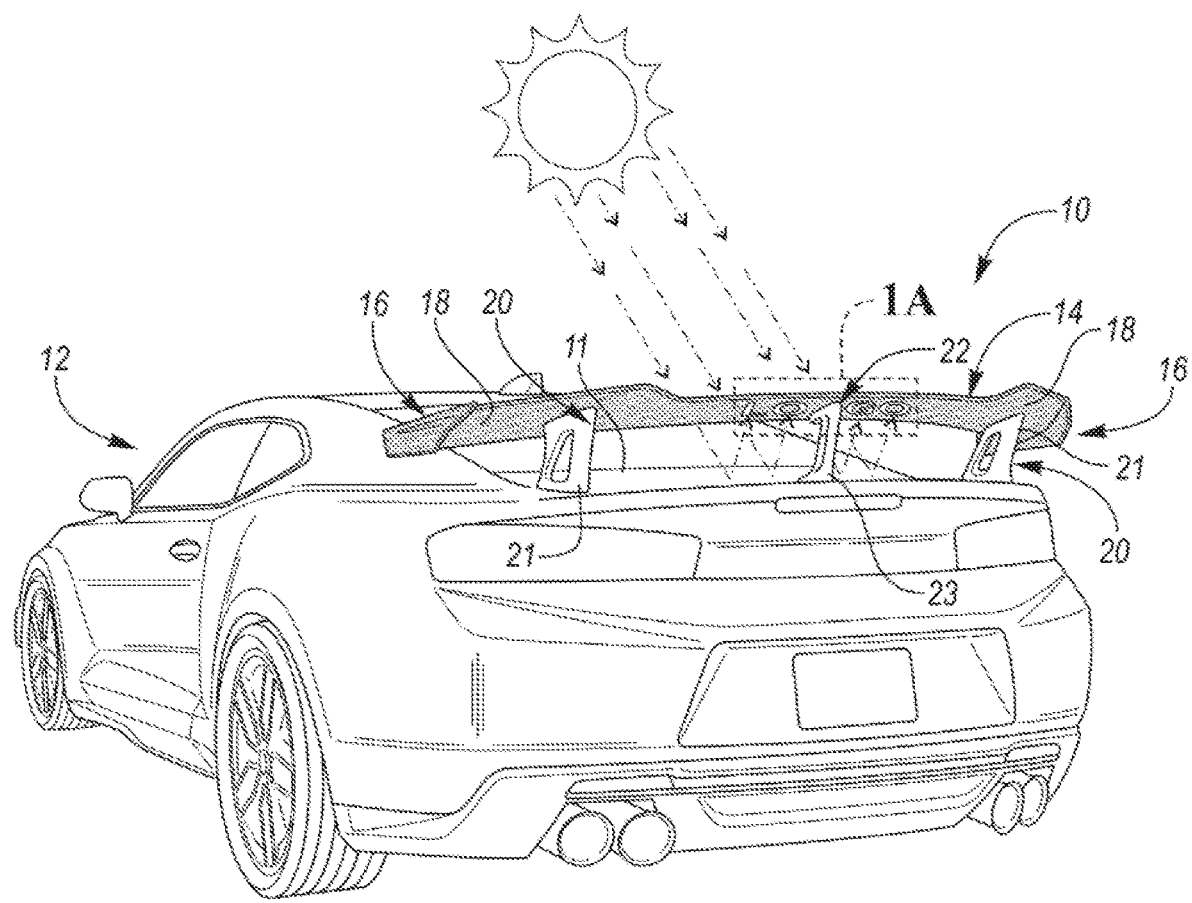
FIG. 1 is an environmental view of a spoiler assembly constructed in accordance with at least one embodiment of the invention, which is mounted on the rear end of an automotive vehicle, is illuminated by ambient light from the sun and which, consequently, has a carbon fiber appearance.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIGS. 1, 1A, 7 and 9, here is illustrated a spoiler assembly, generally includes at 10, mounted on the rear portion or panel 11 of an automotive vehicle 12. The spoiler assembly 10 includes a hollow wing subassembly, generally indicated at 14, and a pair of hollow end cap subassemblies, generally indicated at 16, which are adhesively bonded at opposite ends 18 of the wing subassembly 14. The end cap subassemblies 16 includes right hand (RH) and left hand (LH) subassemblies which are symmetrically opposite to each other.

The wing subassembly 14 is supported above the upper surface of the rear portion of the vehicle 12 by left and right hand hollow stanchion subassemblies or pedestals, generally indicated at 20, and a hollow center stanchion subassembly, generally indicated at 22. Each of the stanchion subassemblies 20 and 22 includes an injection molded outer member 21 and 23, respectively, for securing the assemblies 20 and 22 to the wing subassembly 14, and an injection molded inner member (not shown), for securing the stanchion subassemblies 20 and 22, respectively, to the vehicle 12.

Figure 7:
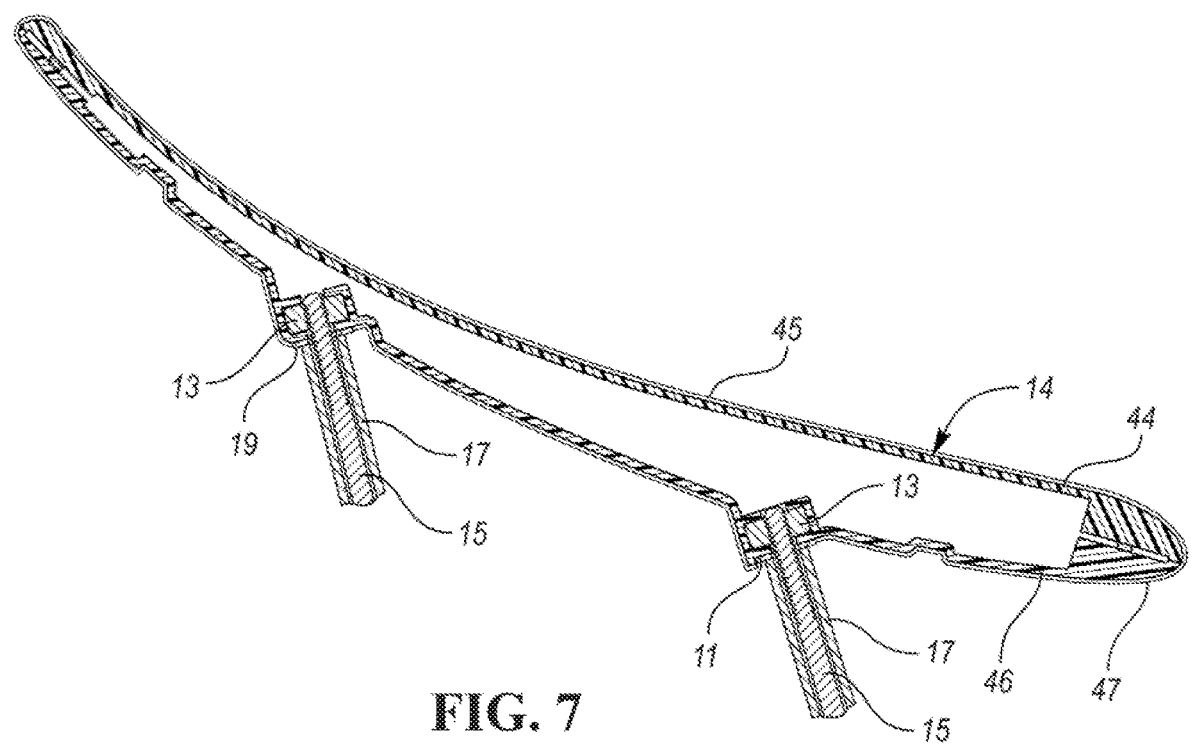
FIG. 7 is a view, partially broken away and in cross-section, showing a wing assembly and mounting hardware of the spoiler assembly of FIG. 1.

The stanchion subassemblies 20 include RH and LH stanchion subassemblies which are symmetrically opposite to each other. Referring specifically to FIG. 7, hardware is the form of nuts 13, elongated bolts 15, elongated bolt sleeves 17, and washers 19 are used to secure the stanchion subassemblies 20 and 22 to the wing subassembly 14 and the rear portion 11 of the vehicle 12. The sleeves 17 function as load bearing spacers to allow load requirements for the stanchions to be met since the thin wall region(s) of the stanchions are not able to do so since they are relatively thin (about 1 mm). The injection molding process allows for an acceptable class-A surface finish of the exterior surfaces of the stanchion.

Previous stanchions typically were solid injection molded parts or milled/cast steel/aluminum parts to meet loading requirements for the stanchions. A problem with solid injection molded parts is that such parts do not yield an acceptable surface finish due to the relatively large cross-sections of such parts.

By making the stanchions subassemblies 20 and 22 hollow, the stanchion subassemblies exhibit a class A surface finish and are light weight yet structurally rigid to meet loading requirements. By using standard, thin wall injection molding techniques together with the sleeves (i.e. load bearing spacers), the stanchion subassemblies 20 and 22 provide solutions to the problems with prior art stanchions.

The outer members 21 and 23 and the inner members are preferably formed from PC-ABS which enables the stanchion subassemblies to be thin-wall injection molded. PC/ABS (Polycarbonate/Acrylonitrile Butadiene Styrene) is a blend of PC and ABS which provides a unique combination of the high processability of ABS with the excellent mechanical properties, impact and heat resistance of PC.

Wing halves 44 and 46 of the assembly 14 are preferably compression molded and each is preferably formed by three plies or layers of fiber-reinforced composite material such as carbon-fiber reinforced plastic (CFRP). Each of the plies is preferably a woven mat of carbon fibers in an epoxy resin matrix. The two outer plies are 3K "veneer" plies and the middle ply is a 12K "structural" plie. The fibers are collected into thread-like bundles called "tows" which are wound onto large bobbins. Standard tow sizes are 1K, 3K, 6K, and 12K. The K designation means "thousands of filaments per tow." For example, a 3K fabric has 3,000 carbon fiber filaments per tow and a 6K fabric has 6,000 filaments per tow. The weaver loads the tows onto a loom where they are woven into a fabric. The most common forms of fabric are:

Woven (plain weave, twill, satin)
Unidirectional, Multidirectional (biaxial, triaxial, quasi-isotropic)
Nonwoven (chopped or continuous strand mats)

Still referring now to FIG. 7, there is illustrated a view of mating upper and lower wing halves 44 and 46, respectively, of the wing subassembly 14. The wing halves 44 and 46 are decorative layers which provide the appearance of a desirable material (i.e. CFRP). The wing halves 44 and 46 are bonded together at their outer perimeters (i.e. mating interface) by an adhesive. The inner surface of the upper wing half 44 includes a flange which is received and retained within a trench or groove formed in the inner surface of the lower wing half 46 and bonded thereto by an adhesive at the mating surfaces of the wing halves 44 and 46. The wing halves 44 and 46 each have an injection molded, light-transmissive, protective layer 45 and 47, inter-bonded to the layers 44 and 46, respectively.

Figure 2:
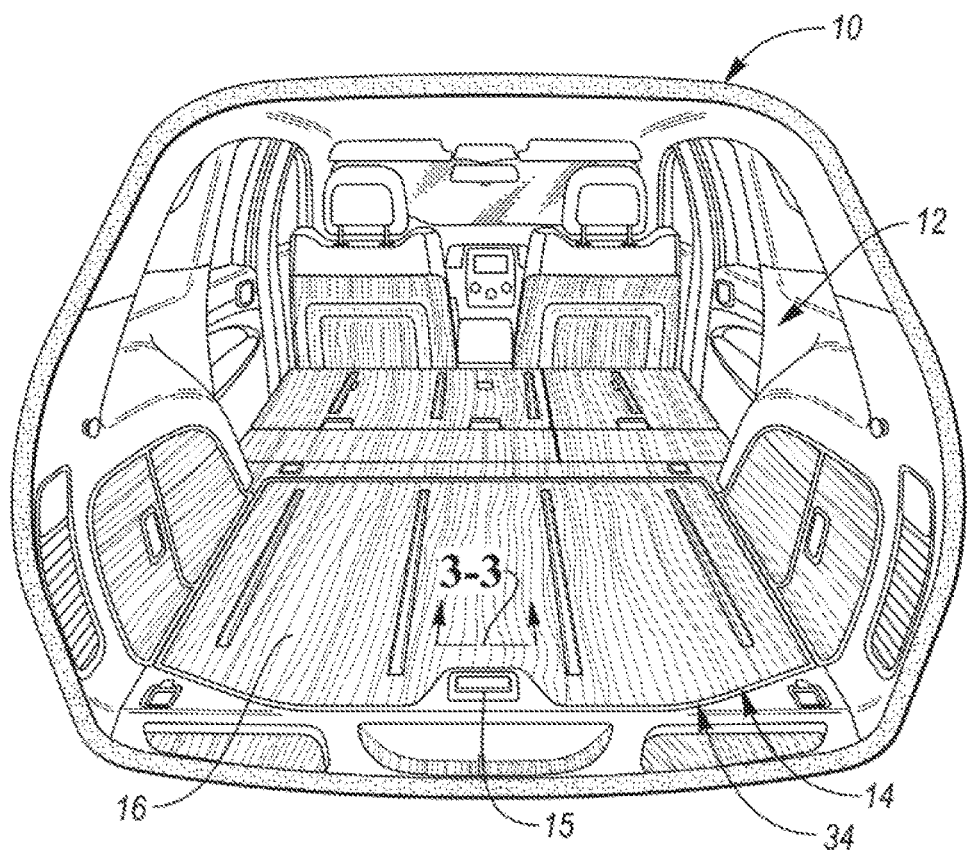
FIG. 2 is a rear perspective view of a prior art automotive vehicle load floor with a cargo trim panel that has a wood grain finish that is illuminated by either ambient or artificial light; and, consequently, has a wood grain appearance.

Referring now to FIG. 2, there is illustrated a prior art cargo management system, generally indicated at 12, located in the interior of a vehicle, generally indicated at 10, to manage cargo placed therein. Such management includes organizing, securing and restraining the cargo. The system 12 includes a vehicle load floor, generally indicated at 14, to compartmentalize a cargo area at the rear of the vehicle 10, into an upper compartment and a covered lowered compartment in which there are typically stored spare tires and/or tools. The load floor 14 has a wood grain finish 16 which is aesthetically pleasing.

A part of the load floor 14 includes a hinged cover, generally indicated at 34, which has a handle 15 to allow a user to hingedly move the cover 34 between open and closed positions. For example, a living hinge may be provided between the cover 34 and the rest of the load floor 14 to allow a user to open the cover 34 and access the lower compartment of the cargo area.

Figure 3:
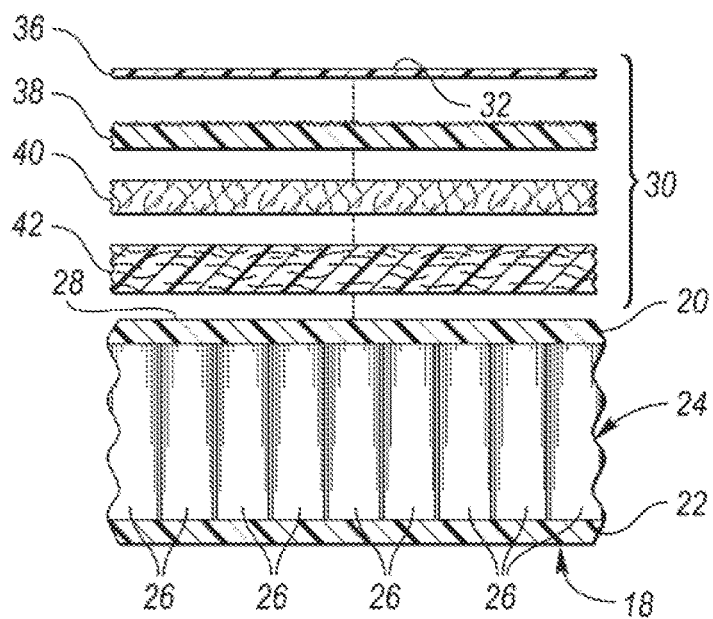
FIG. 3 is a view, partially broken away and in cross section taken along lines 3-3 of FIG. 2, of a prior art compression-molded composite panel and a sheet having multiple layers separated for illustrative purposes.

Referring now to FIG. 3, the prior art load floor includes a compression-molded, composite panel, generally indicated at 18. The panel 18 includes first and second outer skins or layers, 20 and 22 respectively, and a core 24 positioned between the outer layers 20 and 22. The core 24 has a large number of cavities 26. The outer layers 20 and 22 are bonded to the core 24 by press or compression molding.

Each of the skins 20 and 22 may be fiber reinforced. The thermoplastic of the skins 20 and 22 and the core 24 may be polypropylene. At least one of the skins 20 and 22 may be woven skin, such as polypropylene skin. Each of the skins 20 and 22 may be reinforced with fibers, e.g. glass fibers, carbon fibers or natural fibers. At least one of the skins 20 and 22 may advantageously be made up of woven glass fiber fabric and of a thermoplastic material.

The cellular core 24 may be a honeycomb core. In this example, the cellular core 24 has an open-celled structure of the type made up of tubes or a honeycomb, and it is made mainly of polyolefin and preferably of polypropylene. It is also possible to use a cellular structure having closed cells of the foam type.

Figure 6:
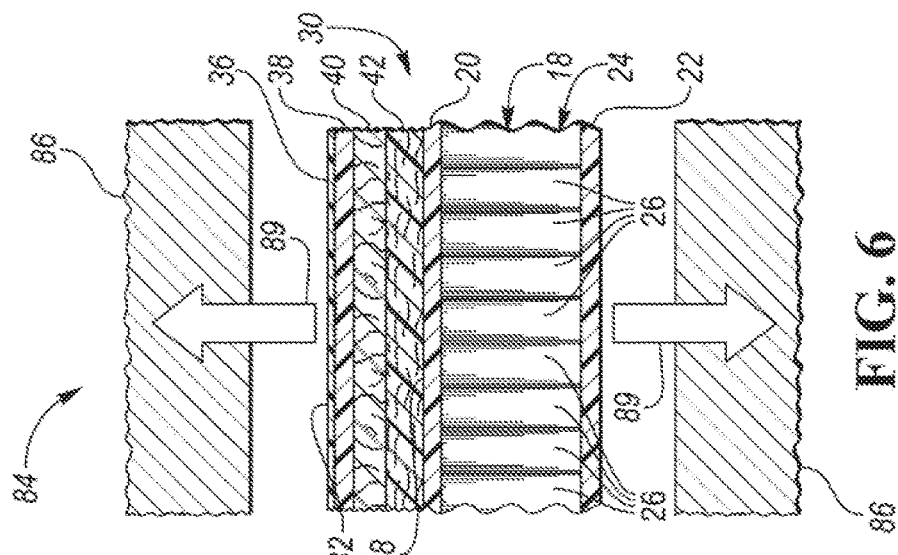
FIGS. 4-6 are views, partially broken away and in cross section, showing different steps in compression molding a stack of different layers of materials to form a prior art article or end product.
Figure 5:
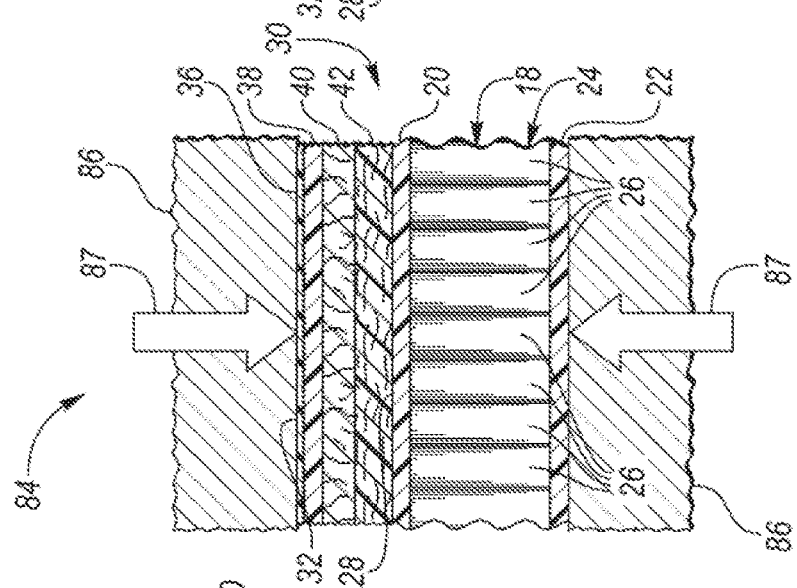
Figure 4:
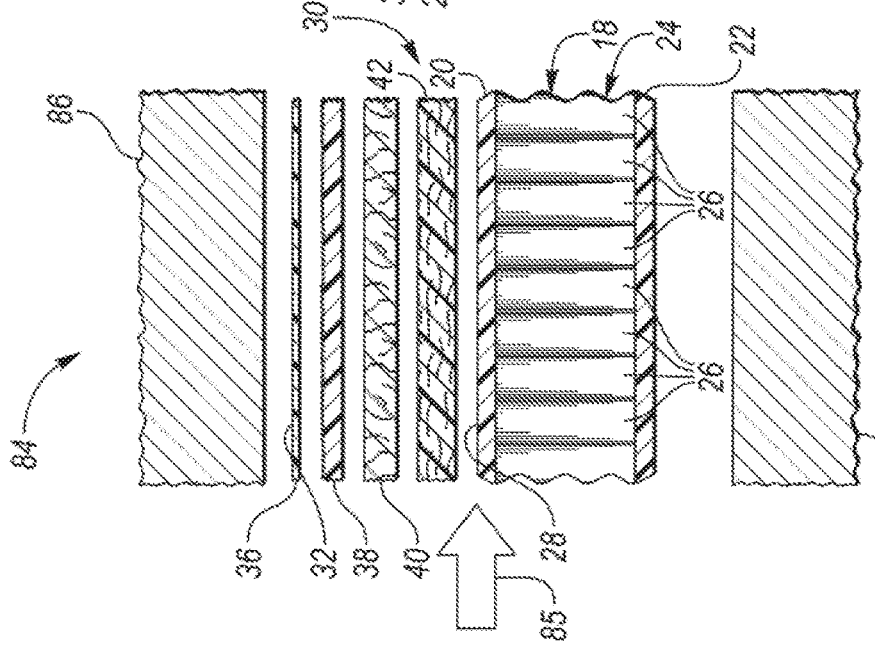

The hinged cover 34, as well the rest of the load floor 14, is typically manufactured by providing a stack of material located or positioned within a mold such as the mold, generally indicated at 84 in FIGS. 4-6. The stack typically includes the first and second reinforced thermoplastic skins or outer layers 20 and 22, respectively, and the thermoplastic cellular core 24 disposed between and bonded to the skins 20 and 22 by press molding. The skins 20 and 22 are heated typically outside of the mold 84 to a softening temperature. The mold 84 is preferably a low-pressure, compression mold 84 having upper and lower mold halves 86 which perform a thermo-compression process on the stack of materials together with a multi-layer coverstock sheet, generally indicated at 30. In the molding process, the sheet 30 is bonded to the top surface 28 of the outer layer 20. The sheet 30 has a substantially planar upper support surface 32 to support cargo in the upper compartment of the cargo area. A pattern or decorative layer 38 of the sheet 30 provides the load floor 14 with the wood grain finish 16 shown in FIG. 2.

The decorative layer 38 may comprise one of a decorative film, a foil, a laminate, a veneer, a fabric, a composite such as carbon fiber, reinforced plastic (CFRP), paper or a coating. For example, the decorative layer 38 may comprise a coverstock sheet bonded to a substrate by press molding in a mold such as a mold, generally indicated at 84 in FIGS. 4-6. The coverstock sheet may provide the panel 18 with a wood grain finish. The coverstock sheet may include a natural wood layer. The wood grain finish of each coverstock sheet may be simulated. The coverstock sheet may use a textured, real-wood surface appearance. The coverstock sheet may include a synthetic resin layer. The coverstock sheet may include a simulated real-wood layer. After the press or compression molding, a varnish or stain coating may be placed on the outer surface.

As shown in FIGS. 3 and 4-6, the prior art multi-layer sheet 30 typically includes a top coat or protective wear layer 36 having the upper surface 32, the pattern or decorative layer 38, a substrate layer 40 and a binder layer 42 to bind or bond the sheet 30 to the top surface 28 of the panel 18 in a press or compression molding operation performed in the mold 84.

The protective layer 36 may be an injection molded, clear top coat resin layer overlying and protecting the decorative layer 38. The layer 36 is inter-bonded to the decorative layer 38 during the injection molding process. The layer 36 may be a transparent or translucent plastic such as polycarbonate (PC), acrylic, ABS, plexi-glass, lexant; polypropylene, polymethyl methacrylate (PMMA), thermoplastic urethane, PET, PETG, LSR, Cyclic Olefin Copolymers, Polyethylene (PE), polyester, copolyester alloy, cyclic olefin copolymer, poly-4-methyl-1-pentene, polysulphone, allyl diglycol carbonate, allyl ester, styrene-acrylonitrile (SAN), polystyrene, polyvinyl chloride (PVC) and blends, alloys and combinations thereof. The layer 36 may include one or more pigments, tints, colored dyes, metallic flakes or light reflective particles therein. The layer 38 and/or the layer 36 may include one or more anti-fading components, one or more anti-soiling components and one or more water-repellant compounds.

The multi-layer sheet 30 may be similar to an engineered wood floor. An engineered wood floor oftentimes includes two or more layers of wood. The pattern or decorative layer 38 typically is the wood that is visible to provide the wood grain finish. A veneer sheet uses a thin layer of wood.

Alternatively, instead of an engineered wood sheet, a laminate or vinyl (i.e. vinyl chloride) sheet may be used. A laminate sheet uses an image of wood at the surface of the decorative or pattern layer 38. A vinyl sheet is plastic formed as look like wood. A laminate sheet is a multi-layer synthetic sheet formed together in a lamination process. A laminate sheet simulates wood with an applique layer as the pattern layer 38 under a clear protective layer such as the protective layer 36. An inner core layer serves as the substrate layer 40. The inner core layer may be composed of melamine resin and fiber board materials.

An advantage of an engineered wood, laminate or vinyl sheet utilized as the coverstock sheet 30 is that periodic maintenance is minimized. An all-wood coverstock sheet finished in varnish requires periodic recoating. Also, bolts and screws require periodic tightening as wood expands and contracts through the seasons of the year.

Also, other advantages of engineered wood laminate or vinyl sheets is lower cost and a more durable surface provided by the wear or decorative layer 36 which is injection molded over the decorative layer 38 as shown in FIGS. 8a-8d. Also, engineered wood laminate or vinyl sheets accommodate design variations not always possible with solid wood sheets. Finally, engineered wood, vinyl and laminate sheets can be formed with a compression-molded composite panel, such as the panel 18, in a single compression or press molding operation as shown in FIGS. 4-6.

Referring again to FIGS. 4-6, in one example method of making the load floor 14, a stack of material may be pressed in the low pressure, cold-forming mold 84 after the stack or layers of material are placed in the mold as indicated by an arrow 85. The stack is made up of the first skin 20, the cellular core 24, the second skin 22 and the covering or sheet 30, and is pressed at a pressure lying in the range of $10 \times 10^5$ Pa. to $30 \times 10^5$ Pa. as indicated by arrows 87. The first and second skins 20 and 24 (as well as the other layers such as the binder layer 42) are preferably pre-heated to make them malleable and stretchable. Advantageously, in order to soften the first and second skins 20 and 24, respectively, heat is applied to a pre-assembly constituted by the stack made up of at least the first skin 20, the cellular core 24, and the second skin 22 so that, while the panel 18 is being formed in the mold 84, the first and second skins 20 and 24 have a forming temperature lying approximately in the range of 160° C. to 200° C., and, in this example, about 180° C. Finally, after curing and cooling, the mold halves 86 are separated as indicated by arrows 89 to remove the part.

Figure 8A:
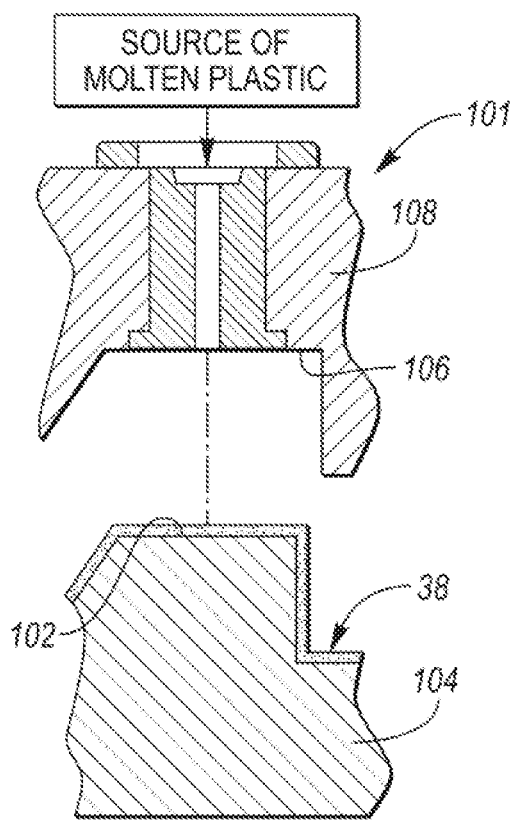
FIGS. 8A-8D are views, partially broken away and in cross section, of a plastic injection mold and illustrating method steps for forming a vehicle trim part or component as shown, partially broken away in cross section in FIG. 8D.
Figure 8B:
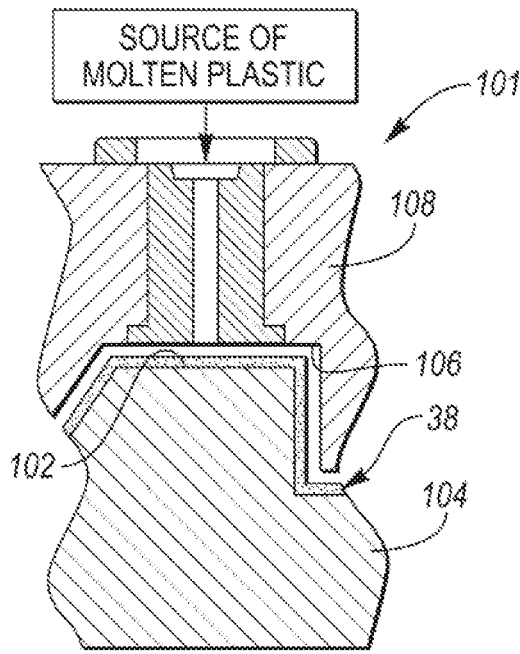
Figure 8C:
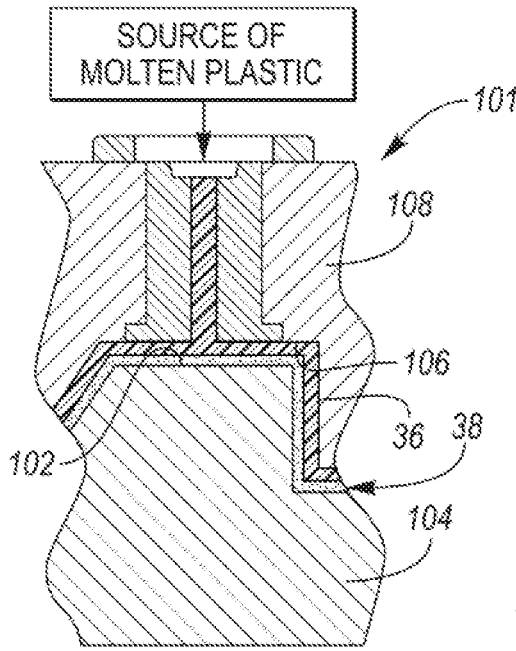
Figure 8D:
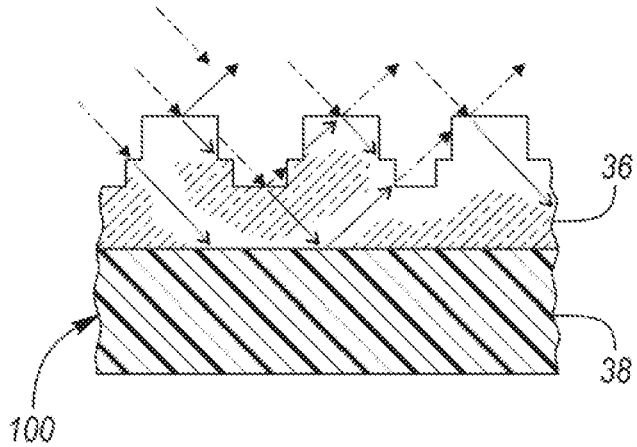

Referring to FIGS. 8A-8C, there is illustrated the sequence of steps to make the vehicle decorative trim part or component 100 of FIG. 8D from the decorative layer 38 (other possible layers and/or substrate(s) being omitted for clarity). With a mold, generally indicated at 101, open in FIG. 8A, the decorative layer 38 (as well as any underlying layers and substrate(s)) is placed on the inner surface 102 of the lower mold half 104. Then the mold 101 is closed in FIG. 8B. In FIG. 8C, molten plastic is injected into the mold 101 between the decorative layer 38 and the lower surface 106 of the upper mold half 108. After cooling, the mold 101 is opened and the resulting vehicle decorative trim part or component including the newly formed, protective layer 76 is removed from the mold 101. A view, partially broken away and in cross section, of the resulting vehicle decorative trim component is shown in FIG. 8D.

Figure 1A:
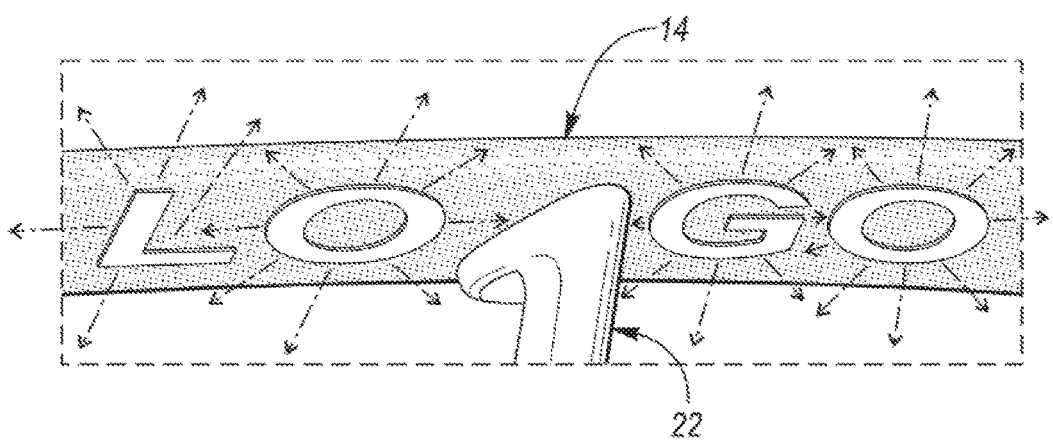
FIG. 1A is an enlarged view taken within the phantom line box labeled 1A in FIG. 1 and particularly showing a reflected light pattern in the form of a "logo"

Some of the desired surface finishes provided by the injection molding of the protective layer include 3-D structures as shown in FIG. 8D and are not limited to the following:

Geometric or patterned shaped;
Leathery texture simulating grain;
Prepared for painting or secondary graphics;
Etched with a logo as shown in FIGS. 1 and 1A;
Blasted for a rough uniform texture;
Gloss, matte, or satin polish; and
Mirror or lens finish.

Figure 9:
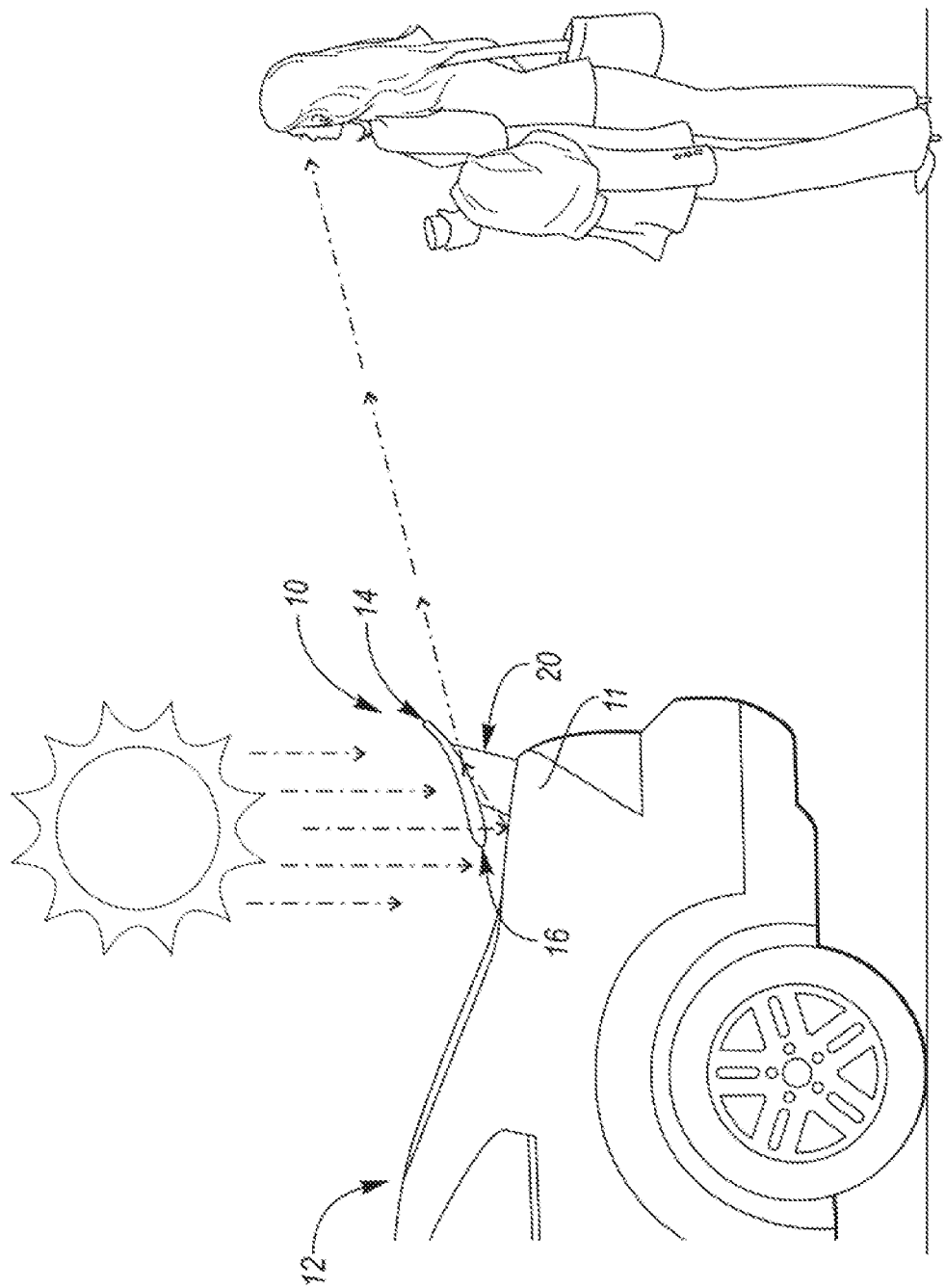
FIG. 9 is a view, partially broken away, of the vehicle of FIG. 1 with the spoiler assembly and illustrating how ambient light from the sun is reflected from the assembly to form a light pattern visible to a human.

In summary, the resulting vehicle, decorative trim part is provided with an injection molded, frontside protective covering or layer 36 which together with the decorative layer 38 reflect incident light and form a reflected light pattern such as a logo or image at the front of the part. The logo or image can be seen as an A-surface of the part and can be viewed during the day (as shown in FIGS. 1 and 9) or at night (if the part is illuminated by artificial light).

Because the protective layer 36 is injection molded under high pressure, a wide variety of surface finishes are provided which require little or no need for post-molding machining or polishing (i.e. "end finishing").

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle decorative trim part having an injection molded, frontside protective covering, the part comprising:
   a decorative layer having an outer surface which provides the appearance of a desirable material; and
   an injection molded, light-transmissive, protective layer inter-bonded to the decorative layer and integrally formed from a polymeric material overlying and protecting the decorative layer and providing a desired outer surface finish with little or no need for post-molding machining or polishing wherein the desired outer surface finish and the outer surface of the decorative layer at the interface between the layers form a reflected light pattern which is visible at the front of the part when lighting illuminates the outer surface finish and the outer surface of the decorative layer from the front of the part wherein the light pattern comprises a logo, a mark, a symbol, a graphic image or a monogram.

2. The part as claimed in claim 1, wherein the protective layer includes 3-D structures bonded to the outer surface of the decorative layer by the injection molding and wherein the 3-D structures are sized, shaped and arranged to irregularly reflect incident light to at least partially form the light pattern.

3. The part as claimed in claim 1, wherein the light pattern provides information.

4. The part as claimed in claim 2, wherein the 3-D structures provide a textured surface finish.

5. The part as claimed in claim 2, wherein the 3-D structures provide style features.

6. The part as claimed in claim 1, wherein the polymeric material is either a thermoset material or a thermoplastic material.

7. The part as claimed in claim 1, wherein the polymeric material protects the decorative layer from UV light and weathering.

8. The part as claimed in claim 1, wherein the desirable material is wood and the surface finish is a wood grain finish.

9. The part as claimed in claim 1, wherein the desirable material is carbon-fiber reinforced plastic (CFRP) and the surface finish is a carbon fiber finish.

10. The part as claimed in claim 1, wherein the protective layer has a thickness between about 0.1 mm and about 1.0 mm.

11. The part as claimed in claim 1, wherein the surface finish is a matte finish.

12. The part as claimed in claim 1, wherein the decorative layer comprises a composite material.

13. The part as claimed in claim 12, wherein the composite material is a carbon fiber-covered composite material.

14. The part as claimed in claim 1, wherein the surface finish is a finish clear of texture.

15. The part as claimed in claim 1, wherein the surface finish is a glossy or semi-glossy finish.

16. A vehicle decorative interior trim part having an injection molded, frontside protective covering, the part comprising:
a decorative layer having an outer surface which provides the appearance of a desirable material; and
an injection molded, light-transmissive, protective layer inter-bonded to the decorative layer and integrally formed from a polymeric material overlying and protecting the decorative layer and providing a desired outer surface finish with little or no need for post-molding machining or polishing wherein the desired outer surface finish and the outer surface of the decorative layer at the interface between the layers form a reflected light pattern which is visible at the front of the part when lighting illuminates the outer surface finish and the outer surface of the decorative layer from the front of the part wherein the desirable material is wood and surface finish is a wood grain finish.

17. The part as claimed in claim 16, wherein the protective layer includes 3-D structures bonded to the outer surface of the decorative layer by the injection molding and wherein the 3-D structures are sized, shaped and arranged to irregularly reflect incident light to at least partially form the light pattern.

18. The part as claimed in claim 16, wherein the light pattern provides information.

19. The part as claimed in claim 17, wherein the 3-D structures provide a textured surface finish.

20. The part as claimed in claim 17, wherein the 3-D structures provide style features.

21. The part as claimed in claim 16, wherein the light pattern comprises a logo, a mark, a symbol, a graphic image or a monogram.

22. The part as claimed in claim 16, wherein the polymeric material is either a thermoset material or a thermoplastic material.

23. The part as claimed in claim 16, wherein the polymeric material protects the decorative layer from UV light and weathering.

24. The part as claimed in claim 16, wherein the protective layer has a thickness between about 0.1 mm and about 1.0 mm.

25. The part as claimed in claim 16, wherein the surface finish is a matte finish.

26. The part as claimed in claim 16, wherein the decorative layer comprises a composite material.

27. The part as claimed in claim 26, wherein the composite material is a carbon fiber-covered composite material.

28. The part as claimed in claim 16, wherein the surface finish is a finish clear of texture.

29. The part as claimed in claim 16, wherein the surface finish is a glossy or semi-glossy finish.

* * * * *